(12) United States Patent
Barnett et al.

(10) Patent No.: US 7,477,961 B2
(45) Date of Patent: Jan. 13, 2009

(54) EQUIVALENT GATE COUNT YIELD ESTIMATION FOR INTEGRATED CIRCUIT DEVICES

(75) Inventors: Thomas S. Barnett, Jericho, VT (US); Jeanne P. Bickford, Essex Junction, VT (US); William Y. Chang, Williston, VT (US); Rashmi D. Chatty, Williston, VT (US); Sebnem Jaji, Flower Mound, TX (US); Kerry A. Kravec, Wappingers Falls, NY (US); Wing L. Lai, Williston, VT (US); Gie Lee, Colchester, VT (US); Brian M. Trapp, Poughkeepsie, NY (US); Alan J. Weger, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 11/382,963

(22) Filed: May 12, 2006

(65) Prior Publication Data

US 2007/0265722 A1    Nov. 15, 2007

(51) Int. Cl.
*G06F 19/00* (2006.01)
(52) U.S. Cl. ................... 700/121; 700/110
(58) Field of Classification Search ........... 700/28, 700/29, 30, 31, 32, 37, 121, 110
See application file for complete search history.

(56) References Cited

U.S. PATENT DOCUMENTS

| | | | |
|---|---|---|---|
| 6,178,539 | B1 | 1/2001 | Papadopoulou et al. |
| 6,751,519 | B1 | 6/2004 | Satya et al. |
| 6,996,790 | B2 | 2/2006 | Chang |
| 7,013,441 | B2 | 3/2006 | Bickford et al. |
| 7,055,113 | B2 * | 5/2006 | Broberg et al. ............... 716/1 |
| 2002/0069396 | A1 * | 6/2002 | Bhattacharya et al. ......... 716/7 |
| 2004/0009616 | A1 * | 1/2004 | Huisman et al. .............. 438/5 |

(Continued)

OTHER PUBLICATIONS

Steven M. Domer, et al, "Model for Yield and Manufacturing Prediction on VLSI Designs for Advanced Technologies, Mixed Circuitry, and Memories", IEEE Journal of Solid-State Circuits, vol. 30, No. 3, Mar. 1995, p. 286-294.

(Continued)

*Primary Examiner*—Ryan A. Jarrett
*Assistant Examiner*—Chad Rapp
(74) *Attorney, Agent, or Firm*—Cantor Colbrun LLP; Richard M. Kotulak

(57) ABSTRACT

A method of modeling yield for semiconductor products includes determining expected faults for each of a plurality of library elements by running a critical area analysis on each of the library elements, and assessing, from the critical area analysis, an expected number of faults per unit area, and comparing the same to actual observed faults on previously manufactured semiconductor products. Thereafter, the expected number of faults for each library element is updated in response to observed yield. A database is established, which includes the die size and expected faults for each of the library elements. Integrated circuit product die size is estimated, and library elements to be used to create the integrated circuit die are selected. Fault and size data for each of the selected library elements are obtained, the adjusted estimated faults for each of the library elements are summed, and estimated yield is calculated.

4 Claims, 4 Drawing Sheets

U.S. PATENT DOCUMENTS

2005/0073875 A1 4/2005 Tohyama
2005/0158888 A1 7/2005 Stine et al.

OTHER PUBLICATIONS

Charles H. Stapper, et al, "Integrated Circuit Yield Statistics", Proceedings of the IEEE, vol. 71, No. 4, Apr. 1983, p. 453-470.

S.-K. Lu, et al, "Modelling economies of DFT and DFY: a profit perspective", IEE Proc.-Comput. Digit. Tech., vol. 151, No. 2, Mar. 2004, p. 119-126.

Charles H. Stapper, "The Defect-Sensitivity Effect of Memory Chips", IEEE Journal of Solid-State Circuits, vol. SC-21, No. 1, Feb. 1986, p. 193-198.

Reinhard Marz, et al, "Yield and Cost Model for Integrated Optical Chips", Journal of Lightwave Technology, vol. 14, No. 2, Feb. 1996, p. 158-163.

Albert V. Ferris-Prabhu, "On the Assumptions Contained in Semiconductor Yield Models", IEEE Transactions on Computer-Aided Design, vol. 11, No. 8, Aug. 1992, p. 966-975.

Fred J. Meyer et al.; "Predicting Defect-Tolerant Yield in the Embedded Core Context;" IEEE Transactions on Computers, vol. 52, No. 11, Nov. 2003; pp. 1470-1479.

\* cited by examiner

| Name | Predicted Faults from Critical Area Analysis | Revised Faults (updated based on observed yield) | (x, y) Dimensions in microns |
|---|---|---|---|
| Library Element 1 | 3e-06 | 3.5e-06 | 1 x 1 |
| Library Element 2 | 5e-06 | 5e-06 | 1 x 1 |
| Library Element 3 | 8e-06 | 1.6e-05 | 2 x 2 |

Fig. 3

EQUIVALENT GATE COUNT YIELD ESTIMATION FOR INTEGRATED CIRCUIT DEVICES

BACKGROUND

The present invention relates generally to the fabrication of integrated circuits and, more particularly, to a method for improved equivalent gate count yield estimation for integrated circuit devices.

The fabrication of integrated circuits is an extremely complex process that may involve hundreds of individual operations. Essentially, the process includes the diffusion of precisely predetermined amounts of dopant material into precisely predetermined areas of a silicon wafer to produce active devices such as transistors. This is typically done by forming a layer of silicon dioxide on the wafer, then utilizing a photomask and photoresist to define a pattern of areas into which diffusion is to occur through a silicon dioxide mask. Openings are then etched through the silicon dioxide layer to define the pattern of precisely sized and located openings through which diffusion will take place.

After a predetermined number of such diffusion operations have been carried out to produce the desired number of transistors in the wafer, they are interconnected as required by interconnection lines. These interconnection lines, or interconnects as they are also known, are typically formed by deposition of an electrically conductive material which is defined into the desired interconnect pattern by a photomask, photoresist and etching process. A typical completed integrated circuit may have millions of transistors contained within a 0.1 inch by 0.1 inch silicon chip and interconnects of submicron dimensions.

In view of the device and interconnect densities required in present day integrated circuits, it is imperative that the manufacturing processes be carried out with utmost precision and in a way that minimizes defects. For reliable operation, the electrical characteristics of the circuits must be kept within carefully controlled limits, which implies a high degree of control over the myriad of operations and fabrication processes. For example, in the photoresist and photomask operations, the presence of contaminants such as dust, minute scratches and other imperfections in the patterns on the photomasks can produce defective patterns on the semiconductor wafers, resulting in defective integrated circuits. Further, defects can be introduced in the circuits during the diffusion operations themselves. Defective circuits may be identified both by visual inspection under high magnification and by electrical tests. Once defective integrated circuits have been identified, it is desired to take steps to decrease the number of defective integrated circuits produced in the manufacturing process, thus increasing the yield of the integrated circuits meeting specifications.

In the present state of the art, accurate yield prediction for an integrated circuit design based on critical area analysis can be performed only after design of the integrated circuit design is complete, while relatively simple and inaccurate die size models are used to predict yield prior to the design being completed. As integrated circuits become increasingly more complex, it is found that the pre and post design yield predictions often do not agree. Financial considerations require a more accurate method for predicating yield (and thus cost) at the time a new integrated circuit is under consideration.

Logic library elements in current technologies have very different circuit packing density. In a conventional "equivalent gate count" modeling approach, it is assumed that all logic circuits are equally susceptible to defects. In practice, large differences are seen between different library elements. In addition, the presently used equivalent gate count prediction method assumes that circuits of a given type (e.g., logic circuits) are uniformly distributed over the entire surface of the die, when in fact this is not the case. Rather, many complex products contain areas of different circuit density. Thus, complex cores impact the yield of semiconductor parts that use these cores. Accordingly, there is a need for a further improved method for integrated circuit product yield prediction, as inaccurately predicted yields often result in poor business decisions when the product is quoted (e.g., lost business opportunity or lower than planned gross margin).

SUMMARY

The foregoing discussed drawbacks and deficiencies of the prior art are overcome or alleviated by a method of modeling yield for semiconductor products. In an exemplary embodiment, the method includes determining expected faults for each of a plurality of library elements by running a critical area analysis on each of the library elements, and assessing, from the critical area analysis, an expected number of faults per unit area, and comparing the same to actual observed faults on previously manufactured semiconductor products. Thereafter, the expected number of faults for each library element is updated in response to observed yield. A database is established, which includes the die size and expected faults for each of the library elements. Integrated circuit product die size is estimated, and library elements to be used to create the integrated circuit die are selected. Fault and size data for each of the selected library elements are obtained, the adjusted estimated faults for each of the library elements are summed, and estimated yield is calculated.

TECHNICAL EFFECTS

As a result of the above summarized invention, a solution is technically achieved which results in an improved method for modeling yield for semiconductor devices, thereby also realizing a cost savings.

BRIEF DESCRIPTION OF THE DRAWINGS

Referring to the exemplary drawings wherein like elements are numbered alike in the several Figures:

FIG. 3 is simplified example of a database of predicted faults for each library element using the method of FIGS. 1 and 2.

DETAILED DESCRIPTION

Disclosed herein is an improved method for modeling yield for semiconductor devices, in which the area density of a particular library element is assessed for fault sensitivity, with this information then used to predict yield by summing the faults for each library element in a product. In contrast to more conventional yield estimation approaches that assume uniform circuit density over the area of a die, the present method provides a more accurate yield (and cost) estimate through consideration of localized fault density differences.

Figure 1:
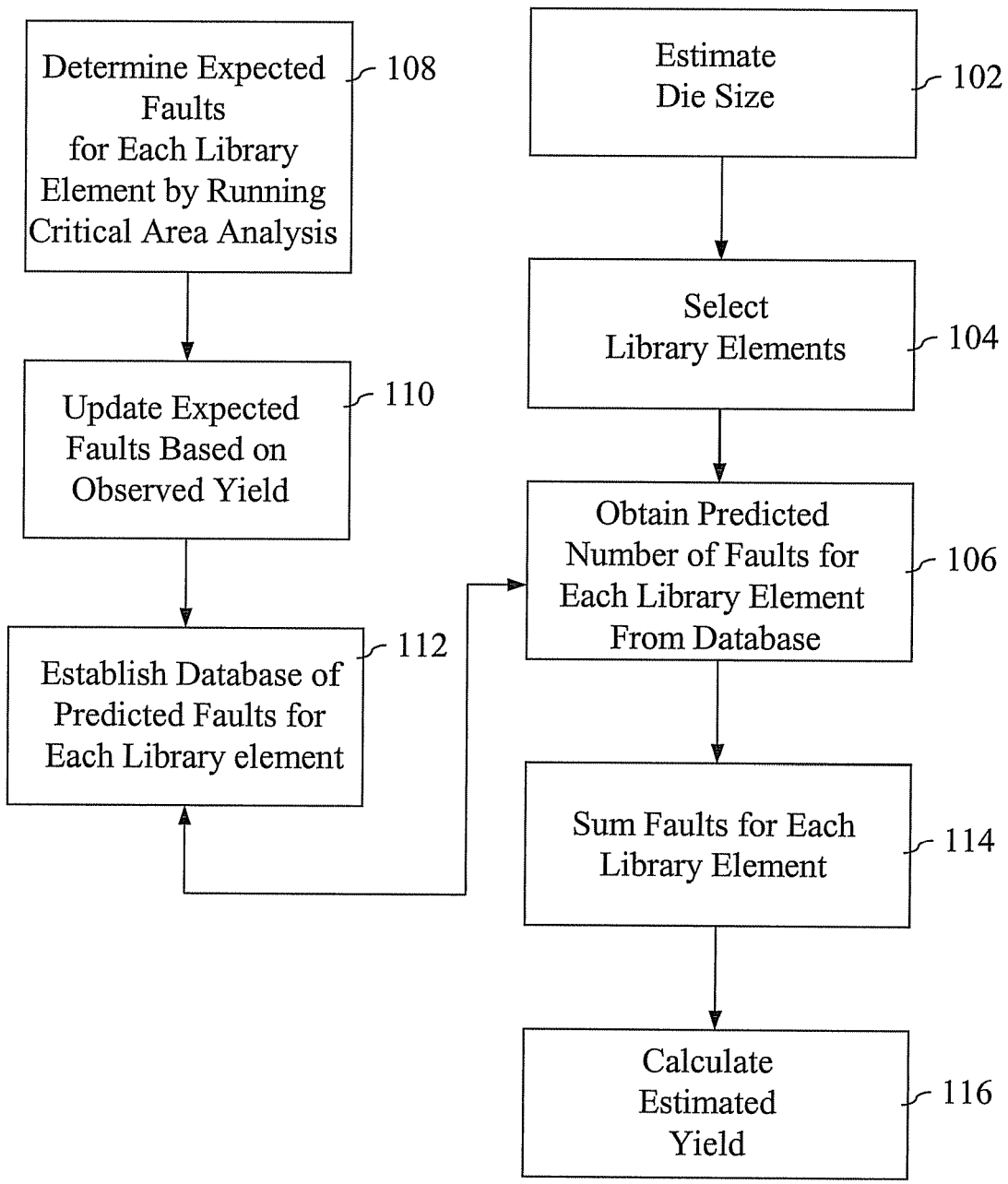
FIG. 1 is a process flow diagram illustrating a method for modeling yield for semiconductor devices, in accordance with an embodiment of the invention.

Referring to FIG. 1, there is shown a process flow diagram illustrating a method 100 for modeling yield for semiconductor devices, in accordance with an embodiment of the invention. As is shown in block 102, the die size is estimated, followed by selecting the library elements (e.g., cells) planned for use in a product design as shown in block 104. Then, for each individual library element, the number of predicted faults for each library element is determined from a database, as shown in block 106.

In an exemplary embodiment, the database is generated through a parallel process, which also depicted in FIG. 1. As shown in block 108, an expected number of faults for each of a plurality of library elements is first determined by running a critical area analysis on each of the library elements. Then, in block 110, an expected number of faults per unit area is assessed from the critical area analysis. This expected number is then compared to actual observed faults on previously manufactured semiconductor products, and the expected number faults for each library element is thus updated in response to observed yield. Upon updating the expected faults based on observed yield, a database of predicted faults for each library element is established, as shown in block 112.

The total number of faults for an integrated circuit die consisting of N library element types may be determined as follows:

$$\lambda(t) = \sum_{i=1}^{N} n_i r_i \lambda_i \tau_i F(t);$$

wherein t=time for which yield estimate is needed;

$\lambda(t)$=total number of faults per chip at time t;

$n_i$=total number of library elements of type i present on the integrated circuit die;

$r_i$=redundancy factor for library element i;

$\lambda_i$=estimated number of faults for the $i^{th}$ library element;

$\tau_1$=adjustment factor for the $i^{th}$ library element, determined by comparing the yield data for that library element with the estimated value $\lambda_i$; and F(t)=learning factor at time t.

The learning factor represents a reduction in manufacturing faults over time, and is the rate at which process engineers can reduce manufacturing faults through process improvements. Once the predicted number of faults for each library is obtained from the database (block 106) and summed as in the equation above to produce the total number of faults for a given integrated circuit chip (block 114), the yield can be predicted. This is shown in block 116 and may be expressed as:

$$Y(t) = Y_C(t) \cdot Y_{0i}(t) \frac{1}{(1 + \lambda(t)/a_i)^{a_i}};$$

wherein

Y(t)=wafer test yield for the integrated circuit die;

$Y_{0i}(t)$=gross systematic test yield for technology i;

$Y_C(t)$=chip custom circuit-limited yield (CLY) factor;

$\lambda(t)$=total average number of faults per chip; and $\alpha_i$=cluster factor.

Because the present methodology takes into consideration the fault contribution of a particular library element, there is a resulting improvement in correlation between the observed yield and the predicted yield. Finally, as shown in block 116, the estimated yield is calculated from the sum of the faults for each of the library elements. Because the present methodology takes into consideration the fault contribution for a particular library element, there is a resulting improvement in correlation between the observed yield and the predicted yield.

Figure 2:
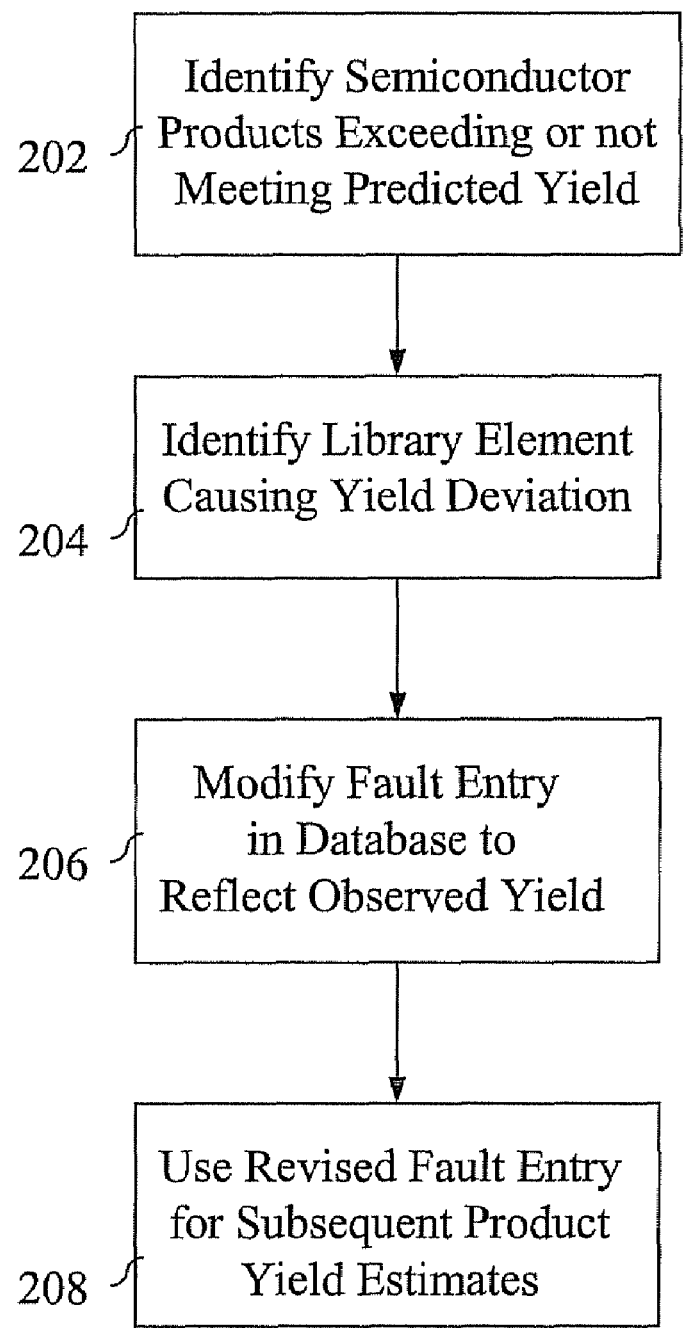
FIG. 2 is a process flow diagram further illustrating an example of updating expected faults in response to observed yield, in accordance with a further embodiment of the invention.

Referring now to FIG. 2, there is shown another process flow diagram that expands upon block 110 of FIG. 1, with regard to updating expected faults based on observed yield. As shown in block 202, specific semiconductor products exceeding or not meeting expected yield are identified. Then, specific library element(s) causing the yield deviation are identified, as shown in block 204. With this information, any fault entries in the database are modified to reflect the observed yield, as illustrated in block 206. In block 208, the revised fault entries are used for any subsequent product yield estimates.

FIG. 3 illustrates simplified example of a database of predicted faults for each of a plurality of library elements (1, 2, 3) using the method of FIGS. 1 and 2. As is shown, the revised predicted yield for library element 1 is unchanged from the critical area analysis as a result of observed yield; however, the revised predicted yield for library elements 2 and 3 are different from the critical area analysis.

Figure 4:
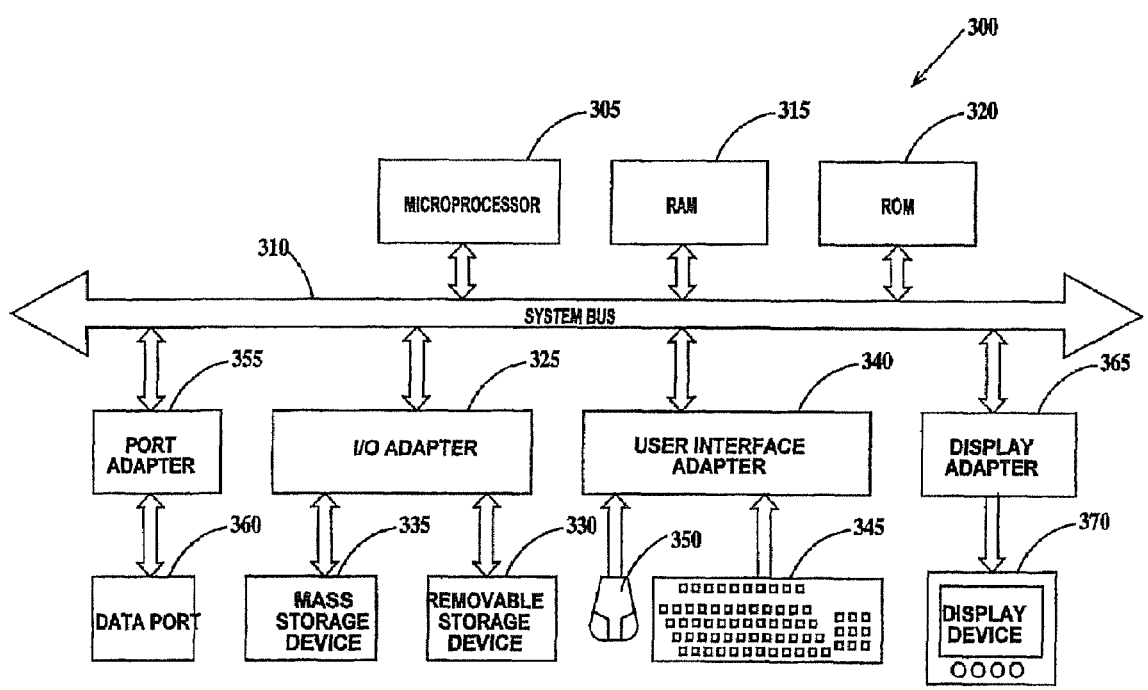
FIG. 4 is schematic block diagram of a general-purpose computing device suitable for practicing the method illustrated in FIGS. 1 and 2.

Generally, the method for modeling integrated circuit yield described herein is practiced with a general-purpose computer and the method may be coded as a set of instructions on removable or hard media for use by the general-purpose computer. FIG. 4 is a schematic block diagram of a general-purpose computer for practicing the present invention. In FIG. 4, computer system 300 has at least one microprocessor or central processing unit (CPU) 305. CPU 305 is interconnected via a system bus 310 to a random access memory (RAM) 315, a read-only memory (ROM) 320, an input/output (I/O) adapter 325 for a connecting a removable data and/or program storage device 330 and a mass data and/or program storage device 335, a user interface adapter 340 for connecting a keyboard 345 and a mouse 350, a port adapter 355 for connecting a data port 360 and a display adapter 365 for connecting a display device 370.

ROM 320 contains the basic operating system for computer system 300. The operating system may alternatively reside in RAM 315 or elsewhere as is known in the art. Examples of removable data and/or program storage device 330 include magnetic media such as floppy drives and tape drives and optical media such as CD ROM drives. Examples of mass data and/or program storage device 335 include hard disk drives and non-volatile memory such as flash memory. In addition to keyboard 345 and mouse 350, other user input devices such as trackballs, writing tablets, pressure pads, microphones, light pens and position-sensing screen displays may be connected to user interface 340. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 330, fed through data port 360 or typed in using keyboard 345.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 1 and 2.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of modeling yield for semiconductor products, the method comprising:
   determining expected faults for each of a plurality of library elements by running a critical area analysis on each of said library elements;
   assessing, from said critical area analysis, an expected number of faults per unit area, and comparing the same to actual observed faults on previously manufactured semiconductor products, and thereafter updating said expected number of faults for each library element in response to observed yield;
   establishing a database, said database including the die size and expected faults for each of said library elements;
   estimating integrated circuit product die size;
   selecting library elements to be used to create an integrated circuit die;
   obtaining fault and size data for each of the selected library elements;
   summing the adjusted estimated faults for each of said library elements; and
   calculating estimated yield;
   wherein the expected total number of faults for an integrated circuit die having N different library element types is determined by the expression:

$$\lambda(t) = \sum_{i=1}^{N} n_i r_i \lambda_i \tau_i F(t);$$

wherein
t=time for which yield estimate is needed;
$\lambda(t)$=total number of faults per chip at time t;
$n_i$=total number of library elements of type i present on the integrated circuit die;
$r_i$=redundancy factor for library element i;
$\lambda_i$=estimated number of faults for the $i^{th}$ library element;
$t_i$ τadjustment factor for the $i^{th}$ library element, determined by comparing the yield data for that library element with the estimate value $\lambda_i$; and
F(t)=learning factor at time t.

2. The method of claim 1, wherein updating said expected faults for each library element in response to observed yield farther comprises:
   identifying yield loss associated with individual library elements;
   modifying faults for said library element in said database; and
   using revised fault entry for subsequent product yield estimates.

3. A method of modeling yield for semiconductor products, the method comprising;
   determining expected faults for each of a plurality of library elements by running a critical area analysis on each of said library elements;
   assessing, from said critical area analysis, an expected number of faults per unit area, and comparing the actual observed faults on previously manufactured semiconductor products, and thereafter updating said expected number of faults for each library element in response to observed yield;
   establishing a database, said database including the die size and expected faults for each of said library elements;
   estimating integrated circuit product die size;
   selecting library elements to be used to create an integrated circuit die;
   obtaining fault and size data for each of the selected library elements;
   summing the adjusted estimated faults for each of said library elements; and
   calculating estimated yield, wherein the calculated yield is determined by the expression;

$$Y(t) = Y_C(t) \cdot Y_{0i}(t) \frac{1}{(1 + \lambda(t)/a_i)^{\alpha_i}};$$

wherein
Y(t)=wafer test yield for the integrated circuit die;
$Y_{0i}(t)$=gross systematic test yield for technology i;
$Y_c(t)$=chip custom circuit-limited yield (CLY) factor;
$\lambda(t)$=total average number of faults per chip; and
$\alpha_i$=cluster factor.

4. The method of claim 3, wherein the wafer test yield for each library element is determined by accessing predicted fault information for each library element, the predicted fault information stored in a database.

* * * * *